No. 779,040. PATENTED JAN. 3, 1905.
P. HERTZOG.
MACHINE FOR CUTTING OPEN THE WEFT LOOPS OF PILE FABRICS.
APPLICATION FILED AUG. 28, 1902.

5 SHEETS—SHEET 2.

Fig. 1ª.

Witnesses:
Arthur Gumpe
Frederick Unfricht

Inventor:
Paul Hertzog
by his attorneys
Roeder & Briesen

No. 779,040. PATENTED JAN. 3, 1905.
P. HERTZOG.
MACHINE FOR CUTTING OPEN THE WEFT LOOPS OF PILE FABRICS.
APPLICATION FILED AUG. 28, 1902.

5 SHEETS—SHEET 3.

Witnesses:
William Schulz
Edward Ray

Inventor:
Paul Hertzog
by his attorneys
Roeder & Briesen

No. 779,040. PATENTED JAN. 3, 1905.
P. HERTZOG.
MACHINE FOR CUTTING OPEN THE WEFT LOOPS OF PILE FABRICS.
APPLICATION FILED AUG. 28, 1902.
5 SHEETS—SHEET 4.
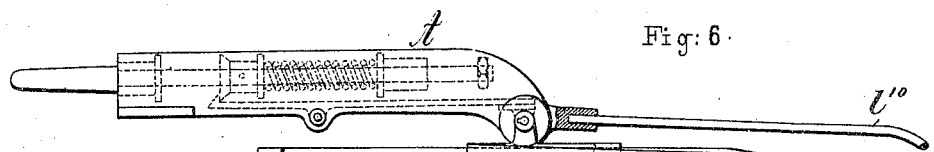
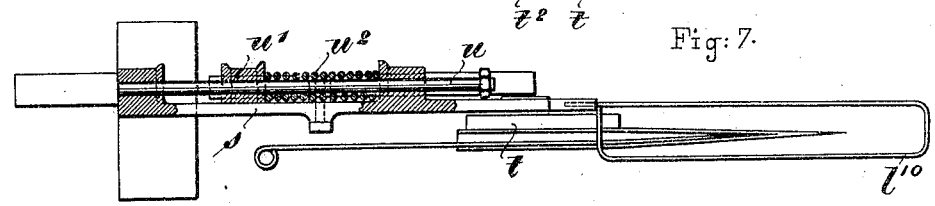
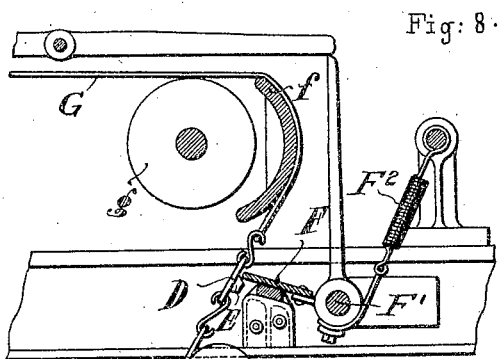
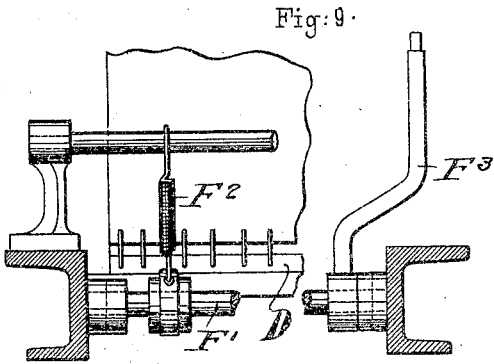
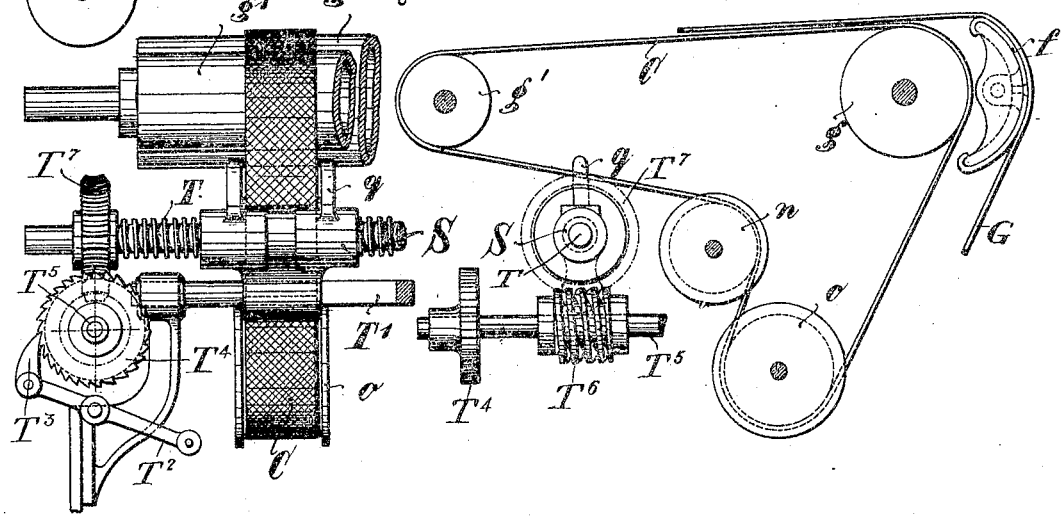
Witnesses
William Schulz
Edward Ray
Inventor:
Paul Hertzog
by his attorneys
Roeder & Briesen No. 779,040. PATENTED JAN. 3, 1905.
P. HERTZOG.
MACHINE FOR CUTTING OPEN THE WEFT LOOPS OF PILE FABRICS.
APPLICATION FILED AUG. 28, 1902.
5 SHEETS—SHEET 5.
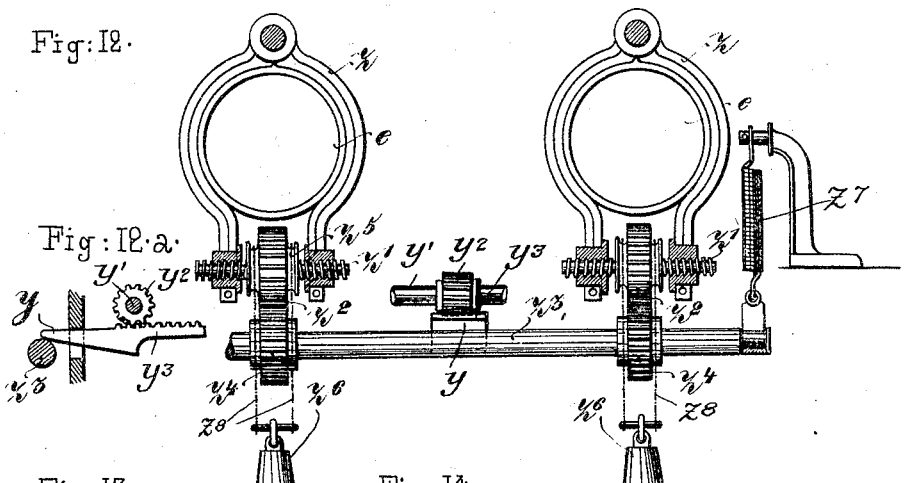
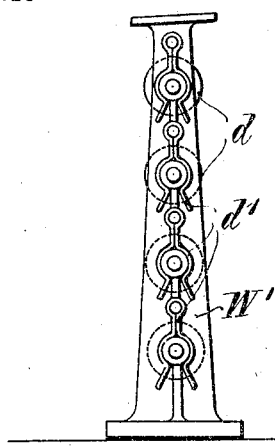
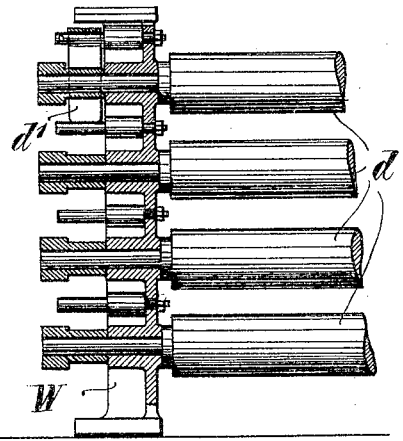
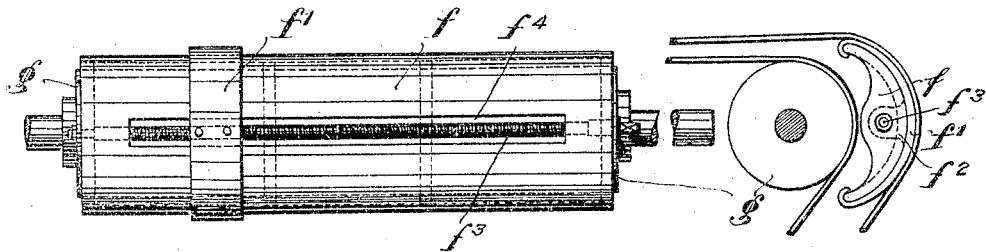
Witnesses
William Schulz
Edward Ray
Inventor:
Paul Hertzog
by his attorneys
Roeder & Briesen No. 779,040. Patented January 3, 1905.

UNITED STATES PATENT OFFICE.

PAUL HERTZOG, OF MÜNCHEN-GLADBACH, GERMANY, ASSIGNOR TO FRANZ MÜLLER MASCHINENFABRIK, OF MÜNCHEN-GLADBACH, GERMANY.

MACHINE FOR CUTTING OPEN THE WEFT-LOOPS OF PILE FABRICS.

SPECIFICATION forming part of Letters Patent No. 779,040, dated January 3, 1905.

Application filed August 28, 1902. Serial No. 121,263.

*To all whom it may concern:*

Be it known that I, PAUL HERTZOG, a citizen of Germany, and a resident of München-Gladbach, Germany, have invented certain new and useful Improvements in Machines for Cutting Open the Weft-Loops of Pile Fabrics, of which the following is a specification.

This invention relates to a machine for cutting open the weft-loops of pile fabrics which operates quickly in automatic manner and does not injure the goods.

Figure 1:
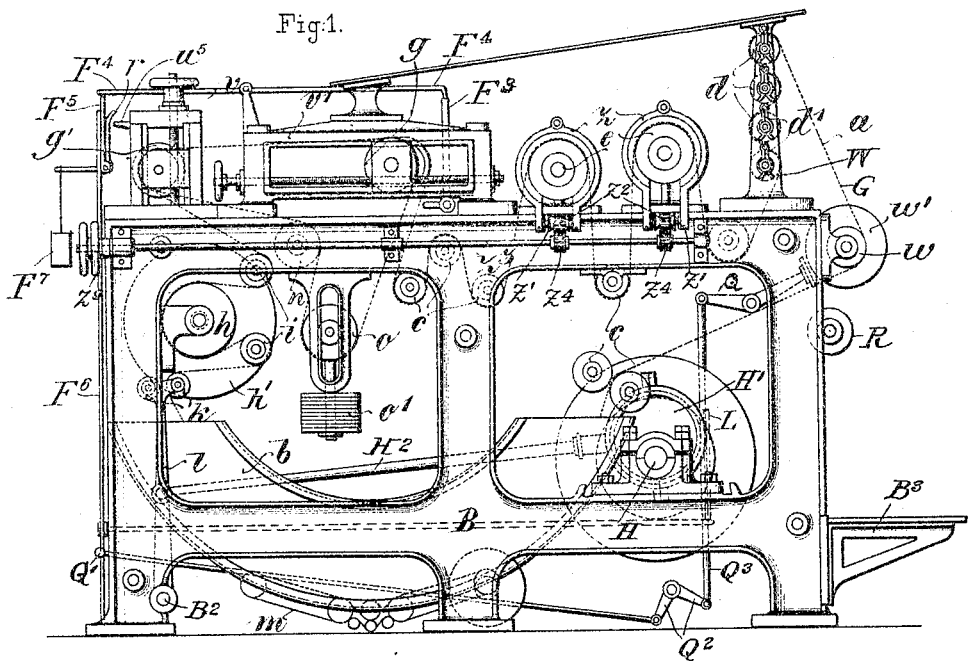
Figure 2:
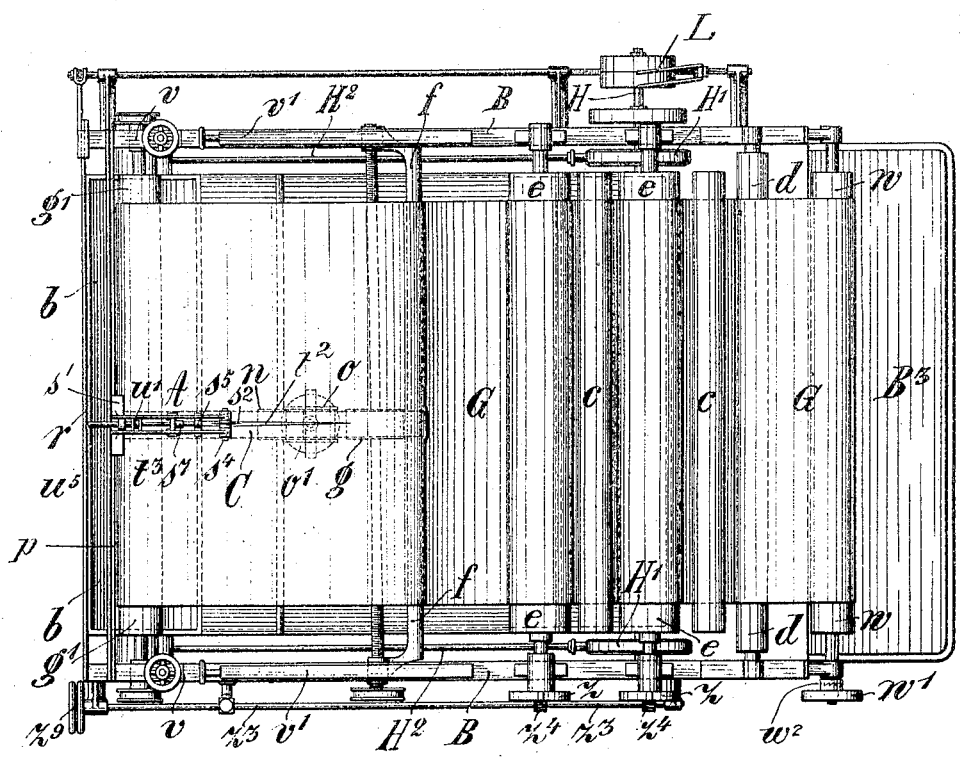
Figure 3:
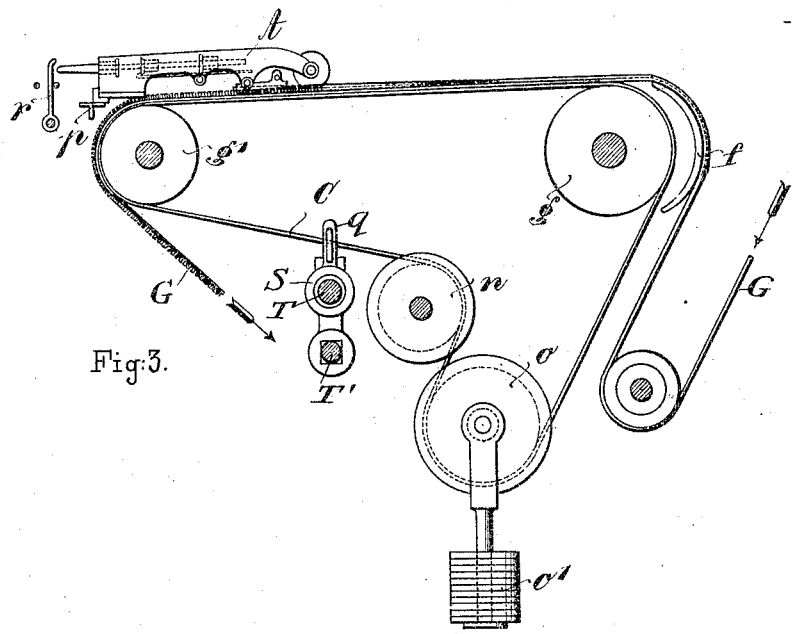
Figure 4:
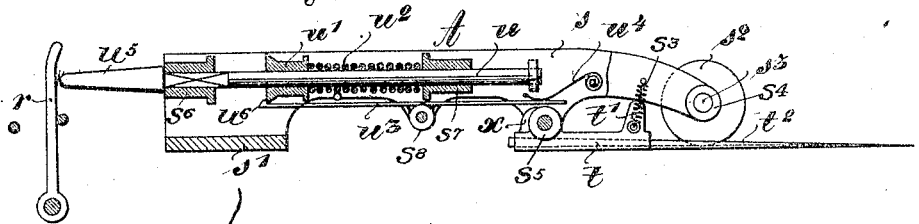
Figure 5:
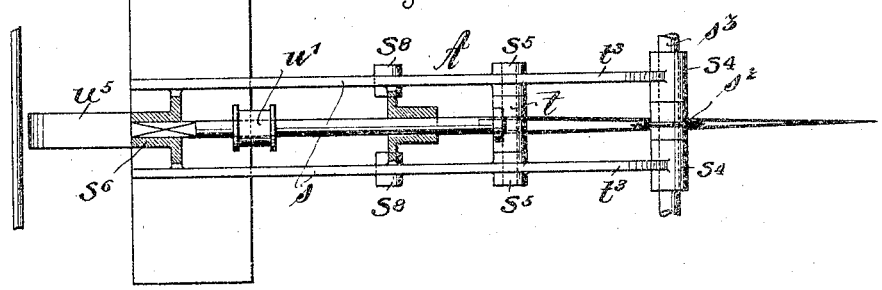

In the accompanying drawings, Figure 1 is a side elevation of my improved machine; Fig. 1$^a$, a plan thereof; Fig. 2, a diagram showing the run of the fabric; Fig. 3, a detail of the belt and adjoining mechanism. Figs. 4 and 5 are details of the cutting mechanism. Figs. 6 and 7 are modifications thereof. Figs. 8 and 9 are details of the fabric-coupling. Fig. 10 is a detail rear view of the belt and its operating mechanism; Fig. 11, a diagram showing the run of the belt. Figs. 12 and 12$^a$ are details of a modification of the brake-operating mechanism; Figs. 13 and 14, details of the strain-regulator, and Figs. 15 and 16 details of the tension-regulator.

The letter B represents the frame of my improved machine, provided at the bottom with a curved basket $b$ for the reception of the folded fabric G, the loops of which are to be cut. The fabric forms an endless band, as hereinafter described, and travels, after leaving basket $b$, between idlers $c\,c$, over roller $w$ through strain-regulator W, over brake-roller $e$, idler $c$, brake-roller $e$, idlers $c\,c\,c$, and tension-regulator $f$. It passes beneath the cutting mechanism A and runs thence over idlers $q'\,i$, feed-roller $h$, idler $i$, and folding-rollers $k\,k$ back to basket $b$, Fig. 2. The bottom of basket $b$ is provided with a longitudinal slot, through which projects an endless belt $m$, supported by a suitable number of rollers and driven by suitable means. In this way the folded fabric is slowly fed along the basket and any friction at the bottom of the basket is avoided. By arranging the fabric in a folded form it is possible to accommodate a considerable length of the same in a relatively small space.

At the top of frame B there are arranged at both sides two boxes or frames $v'$ and $v$. The frames $v'$ receive the adjustable bearings of a roller $g$, while the frames $v$ support the adjustable bearings of roller $g'$. Slightly beyond roller $g$ and fixed to the same bearings there is arranged a guide-segment $f$, hereinafter described.

Between and above rollers $g$ and $g'$ the cutting mechanism A is arranged. It comprises a frame $s$, provided at one end with a baseplate $s'$. The latter is supported by a crossbar $p$ of frame B in such a manner that the frame $s$ may be laterally shifted according to the position of the loops to be cut. The other end of frame $s$ carries two bearings $s^4$, in which the axle $s^3$ of a circular rotatory cutting-knife $s^2$ is mounted. To the frame $s$ is pivoted at $s^5$ a needle guide or holder $t$. This holder is provided with a stud or eccentric $x$ and with an upright finger $t'$, pressed against frame $s$ by springs $s^3$. To the holder $t$ is attached a U-shaped and pointed needle or loop-opener $t^2$, adapted to readily enter the loops. Within the hollow of the U-shaped loop-opener the cutting edge of the rotary knife $s^2$ is received. It will be seen that, owing to the forward motion of the fabric, the loops of one of its rows are entered into by the loop-opener to become first gradually distended and to be then cut open by the knife, which is slowly rotated by the advancing fabric.

In order to prevent the fabric from being injured in case the needle should encounter an obstacle or should pierce the fabric, I provide the cutting apparatus with means which will then immediately stop the machine. For this purpose I arrange within suitable bearings $s^6$ and $s^7$ of frame $s$ a rod or plunger $u$, having a fixed collar $u'$. A spring $u^2$, interposed between bearing $s^7$ and collar $u'$, tends to press rod $u$ to the left, Figs. 4 and 5. The outer end $u^5$ of rod $u$ engages a lever $r$, which is normally held in its position of rest in manner hereinafter described. Lever $r$ in turn engages the shipping-lever $F^6$ of the belt-shifter L. To the frame $s$ is pivoted at $s^8$ a stop-catch $u^3$, having a hook $u^6$ at one end that engages the collar $u'$, while the other end of the catch bears against stud $x$ of needle-holder $t$. The hook $u^6$ is held in engagement with collar $u'$ by spring $u^4$. The position of the various parts during the normal cutting process is illustrated in Figs. 4 and 5. It will be seen that when needle $t^2$ encounters an impediment the still moving fabric will turn needle $t^2$ and needle-holder $t$ downward against the action of springs $s^3$ and out of the way of the knife $s^2$. By this motion of needle-holder $t$ stud $x$ swings catch $u^3$, and thus releases collar $u'$ from hook $u^6$, so that rod $u$ is pressed outwardly against lever $r$ by spring $u^2$. Lever $r$ by engaging shipping-lever $F^6$ operates the belt-shifter L, and thus causes an immediate stoppage of the machine. After the obstruction has been removed the needle is again inserted into the loops, the rod $u$ is pushed back by hand until it is relocked by catch $u^3$, and the machine is restarted.

The ends of the fabric are connected with each other by a coupling or fastener D, so that the fabric forms an endless band. In order to prevent this fastener from running through the cutting mechanism, and thus damaging the same, I provide means for automatically stopping the machine each time one tube or row of loops has been cut open. For this purpose the fastener D is provided with a rail E, which is adapted to engage a lever F, attached to a shaft $F'$ and held in position by a spring $F^2$. Upon shaft $F'$ is rigidly mounted a lever $F^3$, which is engaged by one arm of a double lever $F^4$. The other arm of this lever engages an arm $F^5$ of lever $r$, which is influenced by a weight $F^7$. During the normal run of the machine lever $F^4$ rests upon lever $F^3$ and arm $F^5$, and thus locks the latter in position. If, however, rail E bears against lever F, it will tilt the same so as to move lever $F^3$ away from lever $F^4$. The latter is thus freed, so that arm $F^5$ is unlocked, and weight $F^7$ will tilt lever $r$ in order to actuate the shipping-lever $F^6$ and stop the machine. After the latter has thus been arrested the loop-opener should be withdrawn from the few uncut loops at the end of the fabric, and the machine is restarted for a short time to pass the fastener along the cutter from which it is held away by hand. After the fastener has cleared the cutter the machine is stopped, the cutter is shifted laterally according to the distance between the rows of loops, the loop-opener is inserted into the next row, and the machine is restarted.

During the cutting process the fabric is supported by an endless belt C, which runs over roller $g$ and then together with the fabric runs over roller $g'$, Figs. 10 and 11. The belt is narrower than the fabric and is intermittently shifted laterally to correspond to the lateral movement of cutter A. From roller $g'$ the belt travels over idler $n$, tension-roller $o$, and roller $g$ back to roller $g'$. The bearings of roller $o$ are slidable in a guide of frame B and are provided with weights $o'$ in order to give the belt the proper tension. The lateral movement of belt C is effected by a fork $q$, attached to a nut S. The nut S engages a screw T and is prevented from rotating with screw T by a guide-rod $T'$, engaging a corresponding eye of nut S. The screw T is operated from a hand-lever $T^2$ in the following manner: Lever $T^2$ is provided with a pawl $T^3$, engaging a ratchet-wheel $T^4$, fast on an axle $T^5$. Upon axle $T^5$ is fitted a worm $T^6$, engaging a worm-wheel $T^7$, mounted on screw T. By turning hand-lever $T^2$ up and down after a row of loops has been cut open the belt C is shifted laterally to correspond to the lateral displacement of cutter A.

In order to properly stretch that part of the fabric which is undergoing the cutting operation, I arrange upon guide-segment $f$ a slidable tension-plate $f'$, provided with a nut $f^2$, which projects through a slot $f^4$ of segment $f$ and engages a screw $f^3$, Figs. 15 and 16. The screw is so rotated by hand that the tension-plate $f'$ moves intermittently in accordance with the cutting mechanism A and belt C. The tension-plate $f'$ serves to support the somewhat distended fabric underneath the cut row of loops. After all the rows of loops of the fabric have been cut open the plate $f'$, as well as fork $q$, are brought back to their initial position.

To the belt-shifter are operatively connected two brakes that embrace the rollers $e$ and stop the feed of the fabric when the belt-shifter is operated. The hinged brake-straps $z$ surround the brake-rollers $e$ and terminate in a fork having threaded perforations. These perforations are engaged by a right and left screw $z'$, which carries between the shanks of the fork a pinion $z^2$. The pinions $z^2$ engage pinions $z^4$, fast on a shaft $z^3$. By turning a hand-wheel $z^9$ of shaft $z^3$ in one or the other direction a tightening or loosening of the brake-straps $z$ will thus be effected.

The strain-regulator W of fabric G is composed of a series of rollers $d$ hung in suitable bearings of uprights $W'$, Figs. 13 and 14. Each roller is embraced at one end by a spring $d'$, that constitutes a brake.

The fabric is folded in the following manner before entering basket $b$. It passes between two rollers $k\ k$, which are hung in a swinging lever $l$, pivoted to the frame B at $B^2$, Fig. 1. The lever $l$ receives swinging motion by a pitman $H^2$ and eccentric $H'$, fast on power-shaft H.

During the normal cutting process the fabric is fed by a feed-roller $h$, which receives motion by a pulley $h'$. Between the pulley $h'$ and the feed-roller $h$ a coupling is interposed. For reversing, if necessary, the feed direction during the operation I provide the roller $w$, by an intervening clutch $w^2$, with a pulley $w'$, which rotates the roller in a direction opposite to its normal movement. The clutch or coupling of the feed-roller $h$ is opened, the brake-straps $z$ are taken off, and the feed-roller $w$ is rotated by closing the clutch of pulley $w'$. The fabric will by roller $w$ be delivered to a table $B^3$ of frame B. In order to prevent the fabric from reëntering basket $b$, I pivot a lever Q beyond the run of the fabric to the machine-frame, the free end of the lever being adapted to engage a beam R, arranged beneath the fabric. The lever Q is actuated by a treadle $Q'$ through a bell-crank $Q^2$ and connecting-rod $Q^3$. Thus it will be seen that by depressing treadle $Q'$ during the reversing of the machine the fabric is by lever Q clamped to beam R, so that the fabric will drop properly upon the table $B^3$. After the desired length of material has been drawn back all the parts are returned to their original position and the cutting operation is resumed.

Figs. 6 and 7 illustrate a modification of the cutting apparatus in which a stationary knife is used instead of a rotatory knife. This stationary knife $t^4$ is attached to the inner side of one of the upright shanks of loop-opener $t^2$ in such a manner that the upper pointed cutting edge of the knife slightly projects beyond the loop-opener. The latter is connected to the needle-holder $t$ in the manner already described. As the stationary knife $t^4$ has the tendency to lift the fabric, the latter is guided by a guard $l^{10}$.

Figs. 12 and $12^a$ show a modification of the brake-operating mechanism. By this construction it is possible to immediately tighten the brake-rings without turning shaft $z^3$. For this purpose shaft $z^3$ is so mounted within frame B that it may swing vertically around its bearing near the hand-wheel $z^9$. At its free end the shaft $z^3$ is drawn upwardly by a spring $z^7$, so that pinions $z^2$ and $z^4$ are brought into engagement, Fig. 12. Each screw-bolt $z'$ is provided with two pulleys $z^5$, which are operated by a weight $z^6$, suspended by strings $z^8$. Parallel to shaft $z^3$ there is arranged a shaft $y'$, carrying a pinion $y^2$. This pinion engages a rack $y^3$ of a slide provided with a conical head $y$. It will be seen that by turning shaft $y'$ the conical head $y$ will be moved to the left, Fig. $12^a$. By this movement shaft $z^3$ is depressed and pinions $z^4$ come out of engagement with pinions $z^2$, so that weights $z^6$ come into action and turn screw-bolts $z'$ in such a direction that the brake-rings $z$ become tightened up.

What I claim is—

1. In a machine for cutting the loops of pile fabrics, the combination of a knife and a slidable knife-frame with a U-shaped pointed loop-opener adapted to enter the loop and pivoted to the knife-frame, a belt supporting the fabric below the knife, and means for laterally moving said belt, substantially as specified.

2. In a machine for cutting the loops of pile fabrics, the combination of a knife and a slidable knife-frame with a U-shaped loop-opener pivoted to said frame, a belt supporting the fabric below the knife, means for laterally moving the belt, a guide-segment having a tension-plate adapted to stretch the fabric, and actuating means for sliding the tension-plate, substantially is specified.

3. In a machine for cutting the loops of pile fabrics, the combination of a knife and a slidable knife-frame with a U-shaped loop-opener pivoted to said frame, a plunger movable within the frame and operated by the loop-opener, a lever adapted to be engaged by the plunger, a pile-fabric fastener, a rail projecting from the fastener, a lever engaged by the rail, and a belt-shifter adapted to be actuated by the levers, substantially as specified.

Signed by me at Düsseldorf, Germany, this 11th day of July, 1902.

PAUL HERTZOG.

Witnesses:
 PETER LIEBER,
 WILLIAM ESSENWEIN.